United States Patent
Kelch

[15] 3,667,307
[45] June 6, 1972

[54] STEPPING CLUTCH DEVICE

[72] Inventor: Heinz Kelch, Villingen, Germany

[73] Assignee: Kienzle Apparate GmbH, Villengen, Black Forest, Germany

[22] Filed: Dec. 1, 1970

[21] Appl. No.: 94,128

Related U.S. Application Data

[62] Division of Ser. No. 841,773, July 15, 1969, Pat. No. 3,589,486.

[30] Foreign Application Priority Data

July 9, 1968 Switzerland ............................10833/68

[52] U.S. Cl................................74/126, 74/142, 192/12 B, 192/46
[51] Int. Cl.......................................F16h 27/02, F16d 67/02
[58] Field of Search...................74/126, 142; 192/12 B, 46

[56] References Cited

UNITED STATES PATENTS

| | | | |
|---|---|---|---|
| 1,733,872 | 10/1929 | Graseby | 74/126 |
| 844,550 | 2/1907 | Thomasson | 192/46 UX |
| 3,486,597 | 12/1969 | Carlton | 192/46 |
| 1,719,613 | 7/1929 | Kohler | 74/126 |
| 1,985,406 | 12/1934 | Galkin | 74/126 |
| 2,572,162 | 10/1951 | Koonz | 74/126 UX |
| 2,774,385 | 12/1956 | Rabaseda | 192/46 X |
| 3,200,918 | 8/1965 | Horn | 192/46 |

FOREIGN PATENTS OR APPLICATIONS

| | | | |
|---|---|---|---|
| 474,008 | 5/1951 | Canada | 192/46 |
| 835,877 | 4/1952 | Germany | 81/60 |

*Primary Examiner*—Allan D. Herrmann
*Attorney*—Michael S. Striker

[57] ABSTRACT

A stepping clutch device has two annular outer members with inner ratchet teeth, and an inner member having first and second sets of resilient arms having pawl portions engaging said ratchet teeth and recesses of said two outer members, respectively. The arms can be bent by the ratchet teeth in radial direction during relative turning of the outer and inner members in one direction, but couple the inner and outer members slippage-free during relative turning in the opposite direction. The first outer member is fixed, and the second outer member is biased by a spring toward a first end position in one direction of rotation. Electromagnetic means stepwise turn the second outer member in the opposite direction to a second end position so that the inner member is turned in successive steps in one direction by the spring which is wound up by the electromagnetic means after each step.

10 Claims, 4 Drawing Figures

INVENTOR
Heinz Kelch

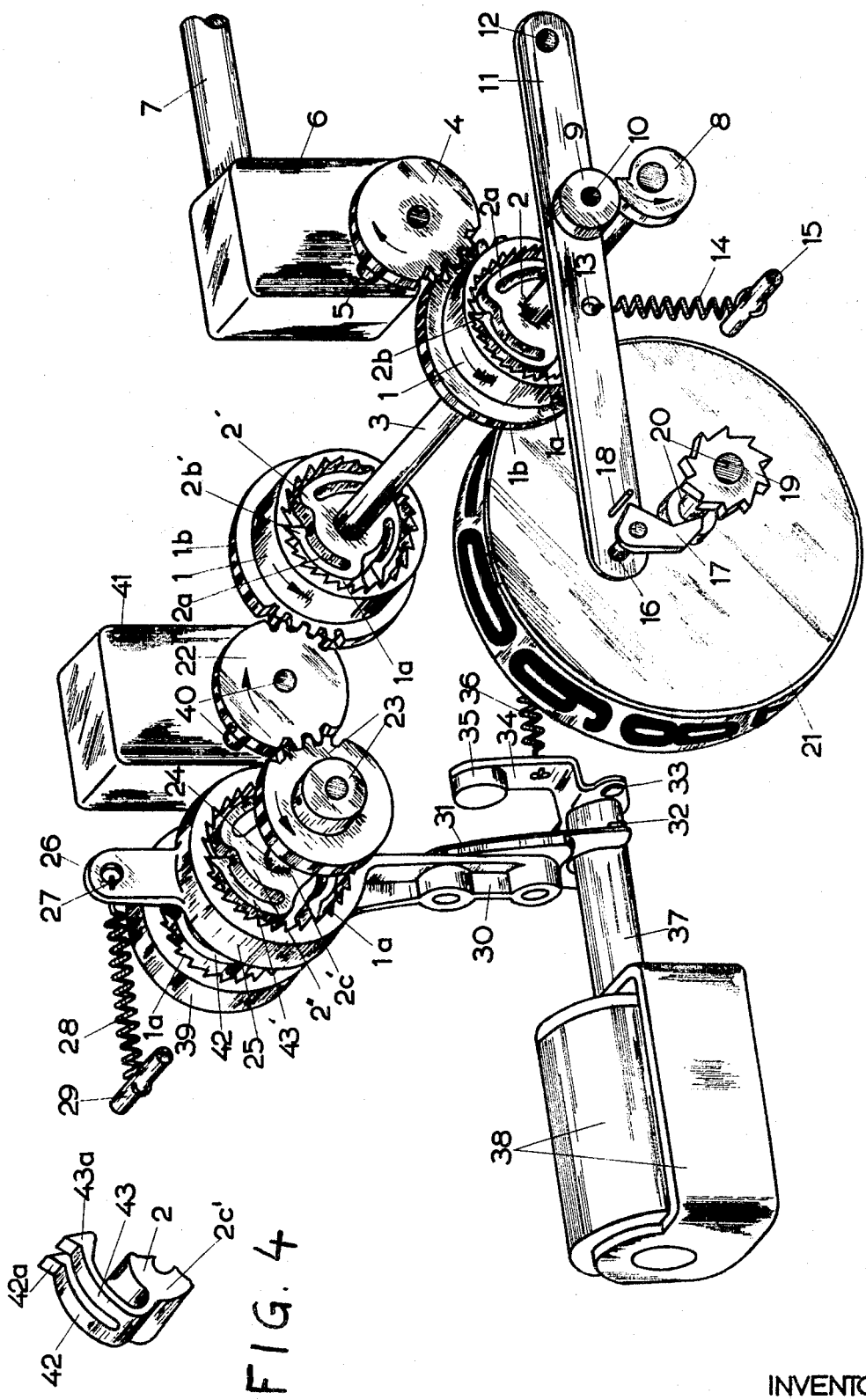

STEPPING CLUTCH DEVICE

The present application is a divisional application of my copending application Ser. No. 841,773, entitled "One Way Clutch Device," filed July 15, 1969 and now Pat. No. 3,589,486.

BACKGROUND OF THE INVENTION

The present invention relates to a stepping clutches with one way clutch devices which transmit rotary motion in one direction between two members, but permit free relative rotation in the opposite direction. One way clutches are advantageously used in taxi meters where an indicator shaft has to be driven in accordance with elapsed time, or in accordance with the travelled distance, depending on which variable causes faster rotation and higher indication of the indicator shaft. In such an arrangement, the indicator shaft is connected by a first one way clutch with drive means representing the distance travelled by the car, and by a second one way clutch with drive means representing the elapsed time, and whatever drive means drives the indicator shaft faster through the respective one way clutch, effects the indication representing the fare which is due. The time drive means usually include a spring motor which is automatically wound up.

The one way clutches according to the prior art include a part driven by the respective drive means, and a part connected with the indicator shaft. In order to obtain a direct, but not too harsh coupling engagement in the desired direction of rotation, the coupling members secured to the indicator shaft should engage free of slippage within an admissible angle of relative movement after actuation. It is also desired that intermittent drive torques are directly, but resiliently transmitted in order to reduce and dampen peak forces at the moment of engagement.

The state of the art is represented by the U.S. Pat. No. 986,758, by the U.S. Pat. No. 1,768,073, and by the British Patent No. 882,515.

The constructions according to the prior art have the disadvantage that they are built of many small parts, are expensive to manufacture and assemble, and cannot avoid very high peaks of transmitted forces at the moment of engagement of the clutch so that the devices are subject to great wear, and have a comparatively short life span.

SUMMARY OF THE INVENTION

It is one object of the invention to overcome the disadvantages of known one way clutch devices, and to provide a stepping clutch device of extremely simple construction, consisting only of few parts, and being inexpensively manufactured and assembled.

Another object of the invention is to provide a clutch device in which peak forces at the moment of the engagement of the clutch parts are avoided.

Another object of the invention is to provide one way clutches consisting of two parts made of synthetic plastic material so that no lubrication is required.

A clutch device used in an embodiment of the invention comprises a first member having ratchet teeth and recesses between the same disposed in a circle having a center located in an axis, and a second member including a plurality of integral resilient arms having pawl portions disposed in a circle having a center located in the same axis. The pawl portions resiliently engage the ratchet teeth and recesses so that each of the first and second members can be turned about the axis only in one direction relative to the respective other member.

In the preferred embodiment of the invention, the first member is annular and has a circular inner surface formed with ratchet teeth and recesses, and the second member is located within the first member and has outwardly projecting resilient arms whose ends are formed by the pawl portions.

Each of the resilient arms has an elongated thin portion extending substantially in circumferential direction along the ratchet teeth, and each ratchet tooth has a substantially radial front face and a sloping back face. During relative turning of the first and second members in one direction, the ratchet teeth slide on the back faces and resiliently bend the circumferentially extending portions of the pawl arms in substantially radial directions. During turning in the opposite direction, the first and second members are coupled since circumferential pressure exerted by the front faces of the ratchet teeth on the pawl portions and only in the first moment slightly bends the circumferentially extending arm portions.

At the moment at which the pawl portions engage recesses and front faces of the ratchet teeth, the elongated thin resilient arm portions are slightly resiliently formed so that force and torque peaks are avoided.

In a preferred embodiment of the invention, the resilient arms of the inner member tend to assume a position of rest in which its pawl portions are located on a circle whose diameter is greater than the diameter of the circle along which the ratchet teeth are located. As a result, when the pawl portions are in engagement with the recesses and ratchet teeth, the thin arm portions are resiliently deformed and prestressed.

If one of the members is fixedly secured, turning movement of the other member is possible only in one direction, and blocked in the opposite direction.

When an outer annular member has inner ratchet teeth, and an inner member has resilient pawls and is secured to a shaft, which can be driven also other drive means, motion is transmitted from the outer member to the inner member and shaft only when the outer member rotates faster than the shaft and the inner member.

A stepping clutch device according to one embodiment of this invention comprises first and second annular outer members, each having an inner surface formed with like ratchet teeth and recesses between the same, said inner surfaces being circular and having a common axis; means securing said first outer member against rotation about said axis; spring means secure to said second outer member for turning the same in one direction about said axis to a first end position; operating means connected with said second outer member for turning the same in a direction opposite to said one direction against the action of said spring means to a second end position; an inner member including first and second sets of resilient arms having like pawl portions, said pawl portions of said first set engaging said ratchet teeth and recesses of said first outer member, and said pawl portions of said second set engaging said ratchet teeth and said recesses of said second outer member so that said inner member can turn relative to said first and second outer members only in said one direction and is blocked by said first outer member against turning in said opposite direction, while being coupled with said second outer member so that when said operating means turns said second outer member in said opposite direction relative to said inner member, said pawl portions slide on said ratchet teeth of said second outer member, and so that when said operating means release said second outer member in said second end position, said spring means turns said second outer member in said one direction to said first end position together with said inner member whose pawl portions of said first set slide on said ratchet teeth of said first outer member.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 3 is a fragmentary perspective view illustrating apparatus for controlling a taxi meter provided with one way clutches according to the invention; and FIG. 4 is a fragmentary perspective view illustrating a detail of a modified clutch device used in the apparatus of FIG. 3.

DESCRIPTION OF THE PREFERRED EMBODIMENTS

Figure 1:
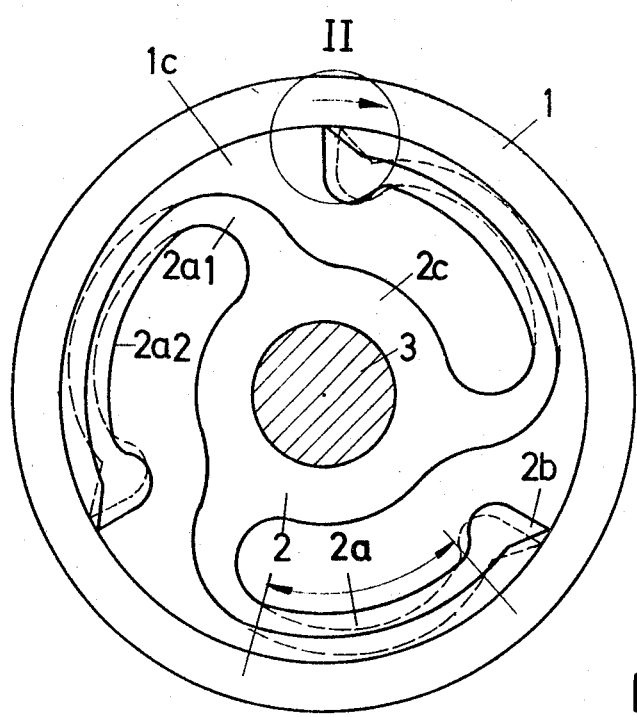
FIG. 1 is a fragmentary schematic elevation illustrating a one way clutch device according to the invention.
Figure 2:
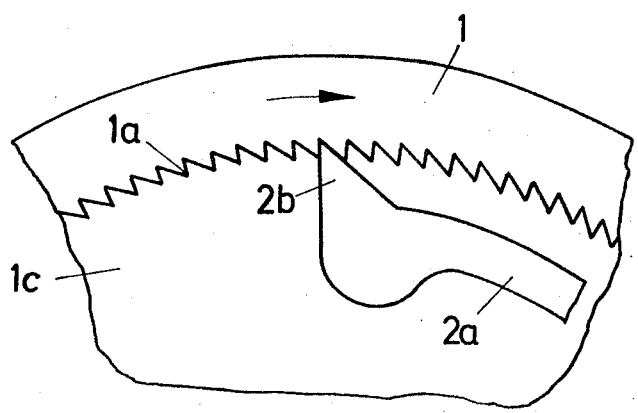
FIG. 2 is a fragmentary schematic elevation on an enlarged scale illustrating a portion of the clutch device shown in FIG. 1 within a circle II.

Referring now to FIGS. 1 and 2, an outer annular member 1 has a circular inner surface formed with ratchet teeth 1a which have substantially radial front faces, and sloping back faces, and generally have saw-tooth shape. An end plate 1c closes one end of the annular outer member 1 so that the same is pot-shaped. As shown in FIG. 3, the end wall 1c may have a flange outwardly projecting from the circular outer member 1, and being provided with peripheral gear teeth meshing with a drive pinion 4. A shaft 3 is mounted for rotation in a bearing in the end wall 1c, and is fixedly secured to a hub portion 2c of an inner member 2 which is provided with three resilient arms 2a, each of which has a pawl portion 2b cooperating with the ratchet teeth and recesses 1a, as shown in FIG. 2. The ratchet teeth 1a are omitted in FIG. 1 for the sake of simplicity.

Each of the arms 2a has a root portion $2a_1$ extending substantially in radial direction, and a thin elongated main portion $2a_2$ which extends substantially in circumferential or tangential direction in relation to the circular row of ratchet teeth 1a. Since portions $2a_2$ are thin and resilient, the arms 2a can be bent in radial direction, and therefore also are somewhat resilient in circumferential or tangential direction, but nevertheless transmit a force exerted by the steep front faces of ratchet teeth 1a onto the respective pawl portions 2b.

FIG. 1 shows resilient arms 2a in solid lines in a resiliently deformed prestressed position. If the inner member 2 is removed from the outer member 1, the points of the pawl portions 2b are located on a circle whose diameter is greater than the diameter of the circular row of ratchet teeth 1a so that pawl portions 2b are resiliently urged into the recesses between the ratchet teeth 1a.

If shaft 3 is turned in clockwise direction with the inner member 2, the pawl portions 2b slide over the back faces of the ratchet teeth 1a. However, if the outer member 1 is turned in clockwise direction, the inner member 2 and the shaft 3 are coupled with the outer member 1 due to the engagement of the pawl portion 2b by the steep front faces of ratchet teeth 1a, and shaft 3 will turn with outer member 1 and inner member 2. When outer member 1 is turned in counterclockwise direction, and shaft 3 with inner member 2 is blocked, the pawl portions 2b will resiliently slide over the back faces of the ratchet teeth 1a and the clutch will not transmit torque. The two faces of each pawl portion 2b are formed to cooperate in the above-described manner with the substantially radial front faces and the sloping back faces of the ratchet teeth 12.

FIG. 3 illustrates an apparatus for driving the indicator of a taxi meter incorporating one way clutch devices according to the invention in a highly advantageous combination. Shaft 3, described with reference to FIGS. 1 and 2, carries at its end a stepped cam 8 cooperating with the roller 9 mounted on a pin 10 carried by a lever 11 which is turned by spring means 14, 15 about pivot 12 and has at its other end a pin 16 on which a pawl 17 cooperating with a ratchet wheel 10 on a shaft 20 is mounted. A pin 18 on lever 11 also controls pawl 17. Shaft 20 fixedly carries a number wheel 21 representing the unit order of the counter of the taxi meter. Whenever shaft 3 is turned one revolution, lever 11 will perform a rocking movement, and the ratchet mechanism 17, 19 will turn the number wheel 21 to indicate the next following digit representing the amount of the fare due.

The inner member 2 is secured to shaft 3, as described with reference to FIG. 1, and the outer member 1 has a flange provided with gear teeth 1b meshing with gear 4 which is driven by means of a transmission 6 from a flexible shaft 7 which is rotated in a conventional manner by means which represent the distance travelled by the car. When member 1 is turned in counterclockwise direction, the ratchet teeth 1a and the pawl portions 2b and member 2 transmit torque to shaft 3 for driving the number wheel 21.

A second one way clutch as described with reference to FIG. 1, also cooperates with shaft 3, and includes an outer annular member 1' with a peripheral gear portion 1b', and an inner member 2' fixedly secured to shaft 3, and having resilient arms 2a' with pawl portions 2b' cooperating with ratchet teeth 1a on the outer annular member 1'. Gear 1b' meshes with a gear 22 and turns in counterclockwise direction when gear 22 turns in clockwise direction. During counterclockwise turning of outer member 1', the inner member 2' is coupled with the outer member and transmits rotary motion to shaft 3.

As will be described hereinafter in further detail, the rotary speed of gear 22 and of the outer member 1' represents time. If outer member 1', coupled with the inner member 2' drives shaft 3 and thereby inner member 2 at a higher speed than the rotary speed of outer member 1 in counterclockwise direction, the pawl portions 2b of inner member 2 will move relative to outer member 1 with pawl portions 2b sliding over the back faces of ratchet teeth 1a. On the other hand, if clutch 1, 2 drives shaft 3 at a higher speed than is transmitted from gear 22 to outer member 1', inner member 2' will turn in counterclockwise direction relative to outer member 1' with pawl portions 2b' sliding over the back faces of ratchet teeth 1a'.

The time depending drive means are shown in the left portion of FIG. 3. A gear 23 is fixedly secured to a shaft 24 and meshes with gear 22. Shaft 24 corresponds to shaft 3, and carries an inner member 2'' which has an inner hub portion 2c' secured to shaft 24, and first and second sets of three pawl arms 42 and 43, best seen in FIG. 4. The three pawl arms 42 are surrounded by a first outer annular member 39 which is secured to a side wall of the apparatus, not shown, and cannot turn. Outer member 39 has ratchet teeth 1a cooperating with pawl portions 42a. The second annular outer member 25 has inner ratchet teeth 1a cooperating with pawl portions 43a of pawl arms 43. Outer member 25 has a projection 26 with a hole 27 to which a spring 28 is connected at one end, while the other end of spring 28 is secured to a stationary stud 29. Another projecting arm 30 on outer member 25 has a contact holder with a pair of contacts 32 cooperating with the corresponding pair of contacts 33 provided on an actuating member 34 which has a rubber cushion 35 and is biased by spring 36. Actuating member 34 is mounted on the armature 37 of an electromagnet 38.

When spring 28 has turned outer member 25 in counterclockwise direction to an end position, contacts 32 engage contacts 33 whereby electromagnet 38 is energized and moves its armature 37 with actuator 34 so that arm 30, 31 is angularly displaced together with outer member 25 and projection 26 whereby spring 28 is tensioned. When cushion 35 separates contact holder 31 with contacts 32 from contacts 33, spring 28 becomes effective to turn outer member 25 in counterclockwise direction to its other end position in which electromagnet 38 is again energized.

When outer member 25 is turned by spring 28 in counterclockwise direction, motion is transmitted to the pawl portions 43a of pawl arms 43 and to shaft 24 which turns gear 23 in counterclockwise direction to drive gear 22 and thereby gear 1b' of outer member 1'. An escapement mechanism 41 of conventional construction regulates the turning speed of gear 22.

Elements 24, 2'', 42, 43, 39, 25, 28, 30, 34, 37, 38 form a stepping clutch device for turning shaft 24 and gears 22, 23 stepwise by the force of spring 28, which is wound up by electromagnetic means 37, 38 after each step so that the spring force is constant.

During turning of outer member 25 with pawl arms 43 in counterclockwise direction, pawl portions 42a slide over the back faces of the stationary outer member 39.

During winding up movement of outer member 25 in clockwise direction, pawl portions 43a slide on the back faces of ratchet teeth 1a of outer member 25, while a small torque is transmitted in clockwise direction to the pawl arms 43. However, this small torque which also tends to turn shaft 24 and pawl arms 42, cannot have an effect on shaft 24, since pawl portions 42a, tending to turn in clockwise direction, are blocked by the front faces of ratchet teeth 1a of the fixed outer member 39.

During operation of the apparatus as shown in FIG. 3, shaft 3 effects the shifting of number wheel 21 to successive digital positions representing monetary units during every revolution with cam 8. When one way clutch 1, 2 is operated by means 4 to 7 representing the distance travelled by the car, shaft 3 is driven at a certain rotary speed. Simultaneously, shaft 3 is driven by the time drive means including gear 22 since the same is in meshing engagement with the outer member 1' of the other clutch.

When the car is at a standstill, or moves at a low predetermined speed, the time drive turns shaft 3 through clutch 1', 2' at a higher speed than the speed at which outer member 1 is turned by gear 4, and consequently inner member 2' is coupled with outer member 1', while inner member 2 is not coupled with outer member 1 since pawl portions 2b slide in counterclockwise direction on the slow-moving ratchet teeth 1a of outer member 1. On the other hand, if the speed of the car is increased, and outer member 1 turns faster than inner member 2', torque is transmitted in counterclockwise direction from outer member 1 to the inner member 2 through ratchet teeth 1a and pawl arms 2a, 2b so that shaft 3, and the number wheel 21, is driven at the speed representing the distance travelled by the car. When the apparatus is started, the time drive 22 to 43 starts to operate which, controlled by the escapement mechanism 41, transmits uniformly spaced timing pulses in the form of step-wise turning movements to the clutch device 1', 2'. As long as the car is stopped or moves at a slow speed, the drive 4 to 7 is ineffective due to the resiliency of the pawl arms 2a. As explained above, the clutch 1, 2 is effective when the car travels at a higher speed in relation to the rotary speed obtained by the time drive.

Due to the fact that the portions $2a_2$, and the corresponding portions of the other clutches, extend in circumferential direction, a slippage-free coupling is obtained between portions 2a and ratchet teeth 1a during turning movement of outer member 1 in counterclockwise direction. On the other hand, turning movement of the inner member 2 in counterclockwise direction is possible relative to outer member 1a, since the ratchet teeth push the pawl portions 2b out of the recesses, while bending the respective thin resilient circumferentially extending portions $2a_2$.

When the time drive is wound up by electromagnet 38 and armature 37, and outer member 25 is turned in clockwise direction a predetermined angle to an end position while spring 28 is tensioned, the ratchet teeth of outer member 25 resiliently bend the resiliently thin circumferentially extending pawl portions 43 in radial direction so that pawl portions 43a can be pushed out of the respective recesses by the back faces of the saw-tooth shaped ratchet teeth. At the same time, pawl portions 42a are engaged by the front faces of ratchet teeth 1a of the fixed outer member 39 so that shaft 24 cannot turn in clockwise direction.

When the spring 28 becomes effective to turn outer member 25 in counterclockwise direction, torque is resiliently transmitted from the front faces of ratchet portions 43a in circumferential direction through the pawl arms 43 which are also somewhat resilient in this direction, so that shaft 24 is turned in counterclockwise direction. At the same time, the back faces of ratchet teeth 1a of outer member 39 displace pawl portions 42a, resiliently deforming the pawl arms 42 in radial direction. A turning movement of shaft 24, and thereby of shaft 3, in the wrong direction of rotation is therefore prevented by the fixed outer member 39.

Particular in connection with the intermittent winding up of the spring motor 25 to 28 and the sudden reversal of the direction of rotation of the same, the function of the resilient pawl arms is of great importance.

It is particular advantage of the invention that all functions required of the apparatus as shown in FIG. 3 can be obtained by one way clutches, each of which consists only of two parts which can be easily assembled at low cost by unskilled labor. Due to the shape of the pawl arms, and also depending on the material from which they are made, an elastic coupling at the moment of engagement is obtained. Due to the provisions of a plurality of resilient pawl arms, the torque is uniformly distributed, and all pawl portions are uniformly distributed in accordance with the pitch of the ratchet teeth. Due to the high resiliency of the pawl arms, the resilient force of each pawl arm is effective in a range which is greater than the pitch of the ratchet teeth. Consequently, under load, one pawl portion after the other engages and effects a stepwise distribution of the entire load torque onto all pawl arms. Due to the understanding and use of these conditions, and making the logical assumption that the arrangement results in low wear of the ratchet teeth and pawl portions, it has been possible to select a very fine tooth pick and sharp point of the pawl portion. In such a construction, it is easy to maintain the slippage in the moment of engagement of the clutch within permissible ranges, and undesired disengagement and complete slipping of the clutches is completely eliminated. Particularly important for the distribution of the load to all pawl arms is the resilient coupling when the clutch is used in combination with an intermittently functioning power accumulator such as an intermittently wound up spring motor, since at the moment of reversal from wind-up to drive, the greatest possible torque of the power accumulator is momentarily effective in the clutch device, acting on the pawl portions.

The tangential or circumferential elasticity of the pawl arms also has the effect of protecting the escapement mechanism of the time drive by dampening the steps of the escapement anchor whereby the span of life of the escapement mechanism is substantially extended. It is advantageous to make the inner and outer members of each one way clutch device according to the invention of a synthetic plastic material so that no lubrication or other servicing is required.

It will be understood that each of the elements described above, or two or more together, may also find a useful application in other types of one way clutches differing from the types described above.

While the invention has been illustrated and described as embodied in a stepping clutch device having a part with circumferentially extending resilient pawl arms cooperating with ratchet teeth of another part, it is not intended to be limited to the details shown, since various modifications and structural changes may be made without departing in any way from the spirit of the present invention.

What is claimed as new and desired to be protected by Letters Patent is set forth in the appended claims.

1. Stepping clutch device comprising, in combination, first and second clutch members, each having a surface formed with ratchet teeth and recesses between the same, and having a common axis; means securing said first clutch member against rotation about said axis; spring means secured to said second clutch member for turning the same in one direction about said axis to a first end position; operating means connected with said second clutch member for turning the same in a direction opposite to said one direction against the action of said spring means to a second end position; an integral third clutch member including first and second sets of resilient arms having pawl portions, said pawl portions of said first set engaging said ratchet teeth and recesses of said first clutch member, and said pawl portions of said second set engaging said ratchet teeth and said recesses of said second clutch member so that said third clutch member can turn relative to said first and second clutch members only in said one direction and is blocked by said first clutch member against turning in said opposite direction, while being coupled with said second clutch member so that when said operating means turns said second clutch member in said opposite direction relative to said third clutch member, said pawl portions slide on said ratchet teeth of said second clutch member, and so that when said operating means release said second clutch member in said second end position, said spring means turns said second clutch member in said one direction to said first end position together with said third clutch member whose pawl portions of said first set slide on said ratchet teeth of said first clutch member, whereby said third clutch member is turned in successive steps in said one direction by said spring means which is wound up by said operating means after each step.

2. Clutch device as claimed in claim 1 wherein said first and second clutch members are integral bodies consisting of a synthetic plastic material.

3. Clutch device as claimed in claim 1 wherein said third clutch member is an integral body consisting of a synthetic plastic material.

4. Clutch device as claimed in claim 1 wherein pairs of resilient arms of said first and second sets are located in common planes passing through said axis.

5. Clutch device as claimed in claim 1 wherein said resilient arms of said third member tend to assume a position of rest in which said pawl portions are located along a circle whose diameter is different from the diameter of the circle along which said ratchet teeth are located so that said arms are resiliently deformed and prestressed when said pawl portions of said first and second sets engage said recesses and ratchet teeth of said first and second clutch members.

6. Clutch device as claimed in claim 1 wherein each of said resilient arms has an elongated thin main portion at whose end said pawl portion is located; wherein said elongated thin main portion extends in circumferential direction along said ratchet teeth and recesses; and wherein each ratchet tooth has a substantially radial front face and a sloping back face so that during turning of said second clutch member in said opposite direction relative to said third clutch member, said ratchet teeth slide on said back faces and resiliently bend said circumferentially extending main portions in substantially radial directions, and so that during turning of said second clutch member in said one direction relative to said third clutch member said second clutch member is coupled with said third clutch member since circumferential pressure exerted by said front faces on said pawl portions and arms only in the first moment slightly bends said circumferentially extending main portions.

7. Clutch device as claimed in claim 1 wherein said operating means include electromagnetic means connected with said second clutch member for turning the same opposite to said one direction, and switch means closed in said first end position to energize said electromagnetic means to turn said second clutch member to said second end position, and opened by said electromagnetic means in said second end position to de-energize said electromagnetic means.

8. Stepping clutch device comprising, in combination, first and second annular outer members, each having an inner surface formed with like ratchet teeth and recesses between the same, said inner surfaces being circular and having a common axis; means securing said first outer member against rotation about said axis; spring means secured to said second outer member for turning the same in one direction about said axis to a first end position; operating means connected with said second outer member for turning the same in a direction opposite to said one direction against the action of said spring means to a second end position; a shaft; an integral inner member including a hub secured to said shaft within said first and second outer member, and first and second sets of resilient arms integrally projecting from said hub and having like pawl portions, said pawl portions of said first set engaging said ratched teeth, and recesses of said first outer member, and said pawl portions of said second set engaging said ratchet teeth and said recesses of said second outer member so that said inner member can turn relative to said first and second outer members only in said one direction and is blocked by said first outer member against turning in said opposite direction, while being coupled with said second outer member so that when said operating means turns said second outer member in said opposite direction relative to said inner member, said pawl portions slide on said ratchet teeth of said second outer member, and so that when said operating means release said second outer member in said second end position, said spring means turns said second outer member in said one direction to said first end position together with said inner member whose pawl portions of said first set slide on said ratchet teeth of said first outer member.

9. Clutch device as claimed in claim 8 wherein each of said resilient arms has an elongated thin main portion at whose end said pawl portion is located; wherein said elongated thin main portion extends in circumferential direction along said ratchet teeth and recesses; and wherein each ratchet tooth has a substantially radial front face and a sloping back face so that during turning of said second outer member in said opposite direction relative to said inner member, said ratchet teeth slide on said back faces and resiliently bend said circumferentially extending main portions in substantially radial directions, and so that during turning of said second outer member in said one direction relative to said inner member said second outer member is coupled with said inner member since circumferential pressure exerted by said front faces on said pawl portions and arms only in the first moment slightly bends said circumferentially extending main portions.

10. Clutch device as claimed in claim 9 wherein said inner member has a central portion from which said resilient arms project; wherein each set of said first of second sets includes three resilient arms; wherein pairs of resilient arms of said first and second sets are located in common equally angularly spaced planes passing through said axis; and wherein said inner member is integral and consists of a synthetic plastic material.

* * * * *